(12) United States Patent
Sawada

(10) Patent No.: US 6,272,284 B1
(45) Date of Patent: Aug. 7, 2001

(54) IMAGE/AUDIO REPRODUCING APPARATUS

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/037,886

(22) Filed: Mar. 10, 1998

(30) Foreign Application Priority Data

Mar. 10, 1997 (JP) .................................................. 9-054938

(51) Int. Cl.$^7$ ........................... H04N 5/907; H04N 5/928
(52) U.S. Cl. ............................................... 386/98; 386/105
(58) Field of Search ................................ 386/96, 98, 104, 386/105, 106, 46, 124, 125, 52, 64, 39, 40, 1, 4, 45, 109, 111, 112, 33, 27; H04N 5/85, 5/907, 5/928

(56) References Cited

U.S. PATENT DOCUMENTS 4,777,537 * 10/1988 Ueno et al. ............................ 386/96
5,512,106   4/1996 Tamai et al. .

FOREIGN PATENT DOCUMENTS 6-295894   10/1994 (JP) .

* cited by examiner

*Primary Examiner*—Robert Chevalier
(74) *Attorney, Agent, or Firm*—Foley & Lardner

(57) ABSTRACT

An image/audio reproducing apparatus for decording/reproucing coded data in which digitally compressed/coded image and audio data are multiplexed, which includes a data storage unit for storing coded data; a BS memory for temporarily storing the coded data read out from the data storage unit; image and audio data area lookup tables for storing address informations of data strings respectively having continuous image and audio data in the BS memory; a system decoder for loading the coded data from the data storage unit to the BS memory, analyzing a header of the coded data to detect an image data string and an audio data string, and upon detecting the image or audio data string, storing address information of the image or audio data string in the image or audio data area lookup table; a video decoder for accessing the BS memory in accordance with the address information in the image data area lookup table to read out the image data stored in the BS memory and detecting the image data; and an audio decoder for accessing the BS memory in accordance with the address information in the audio data area lookup table to read out the audio datastored in the BS memory and decording the audio data.

10 Claims, 10 Drawing Sheets

IMAGE/AUDIO REPRODUCING APPARATUS

BACKGROUND OF THE INVENTION

1. Field of the Invention

The present invention relates to an image/audio reproducing apparatus for decoding/reproducing digitally compressed/coded image and audio data.

2. Description of the Prior Art

An image/audio reproducing apparatus for decoding/reproducing digitally compressed/coded image and audio data includes a system decoder for demultiplexing the multiplexed compressed/coded data into image data and audio data, a video decoder for decoding/reproducing the image data, and an audio decoder for decoding/reproducing the audio data.

FIG. 1 is a block diagram showing the arrangement of a conventional image/audio reproducing apparatus.

In the conventional image/audio reproducing apparatus, each of a system decoder 22, a video decoder 23, and an audio decoder 24 has an independent data memory. First, multiplexed compressed/coded data is loaded from a data storage unit 21 into a data memory (SBS memory) 25 of the system decoder 22. The system decoder 22 demultiplexes the data, and the demultiplexed image and audio data themselves are copied to the data memories (a VBS memory 26 and an ABS memory 27) of the video decoder 23 and audio decoder 24, respectively, so the data are transferred between the decoders. The video decoder 23 and audio decoder 24 sequentially load the data from the data memories 26 and 27, respectively, and decode the data.

Such a conventional image/audio reproducing apparatus is disclosed in Japanese Unexamined Patent Publication No. 7-153192.

In the above-described conventional apparatus, particularly, as the bit rate (the number of bits to be processed per second) of coded data rises, the load necessary for memory copy of data between the decoders increases to degrade the decoding performance of the reproducing apparatus.

Especially, when decoding is executed on the basis of software, the data processing capability become low, so real-time reproduction may be disabled. The data are not reproduced in real time (the original image/audio reproduction rate).

If real-time reproduction is disabled, decoding of appropriate frames must be omitted (time-lapse reproduction) in the image reproducing apparatus to synchronize the image and audio data. However, this generates a sense of incompatibility in viewing the image.

SUMMARY OF THE INVENTION

The present invention has been made in consideration of the above situation of the prior art and has as its object to provide an image/audio reproducing apparatus capable of solving the problem of degradation of performance of the reproducing apparatus in data transfer between decoders.

According to the first aspect of the present invention, there is provided an image/audio reproducing apparatus comprising:

a data storage unit for storing coded data;

a BS memory for temporarily storing the coded data read out from the data storage unit;

an image data area lookup table for storing address information of a data string having continuous image data in the BS memory;

an audio data area lookup table for storing address information of a data string having continuous audio data in the BS memory;

a system decoder for loading the coded data from the data storage unit to the BS memory, analyzing a header of the coded data to detect an image data string and an audio data string, and upon detecting the image data string, storing address information of the image data string in the image data area lookup table, and upon detecting the audio data string, storing address information of the audio data string in the audio data area lookup table;

a video decoder for accessing the BS memory in accordance with the address information in the image data area lookup table to read out the image data stored in the BS memory and decoding the image data; and an audio decoder for accessing the BS memory in accordance with the address information in the audio data area lookup table to read out the audio data stored in the BS memory and decoding the audio data.

According to the second aspect of the present invention, each of the image data area lookup table and the audio data area lookup table in the first aspect is a set of table entries in which a set of start address information and length information of the data string having continuous image or audio data in the BS memory is stored.

According to the third aspect of the present invention, the BS memory in the first aspect comprises a ring buffer having a predetermined size.

According to the fourth aspect of the present invention, the image/audio reproducing apparatus further comprises a whole control section for designating an amount of the coded data to be demultiplexed into the image data and the audio data to the system decoder and designating the number of frames to be decoded to the video decoder and the audio decoder.

The apparatus of the present invention shares the data memory (BS memory) for temporarily storing coded data among the system decoder, the video decoder, and the audio decoder, and has the image data area lookup table for storing the address information of the data string having continuous image data in the BS memory and the audio data area lookup table for storing address information of the data string having continuous audio data. Data transfer between decoders is indirectly performed with reference to the data area lookup tables storing the address information in the BS memory.

Therefore, the conventional problem, i.e., degradation in data processing capability of the reproducing apparatus due to the load in data transfer processing between decoders, which disables real-time reproduction, can be almost solved.

As described above, according to the present invention, degradation in data processing capability of the reproducing apparatus due to the load in data transfer processing between decoders, which disables real-time reproduction, can be almost solved. Even when the data processing capability of the reproducing apparatus is absolutely low, the number of frames to be time-lapsed to synchronize the image and audio data decreases, so the sense of incompatibility in the image can be minimized.

The above and many other advantages, features and additional objects of the present invention will become manifest to those versed in the art upon making reference to the following detailed description and accompanying drawings in which preferred embodiments incorporating the principles of the present invention are shown by way of illustrative examples.

DETAILED DESCRIPTION OF THE PREFERRED EMBODIMENT

A preferred embodiment of the present invention will be described below with reference to the accompanying drawings.

Figure 1:
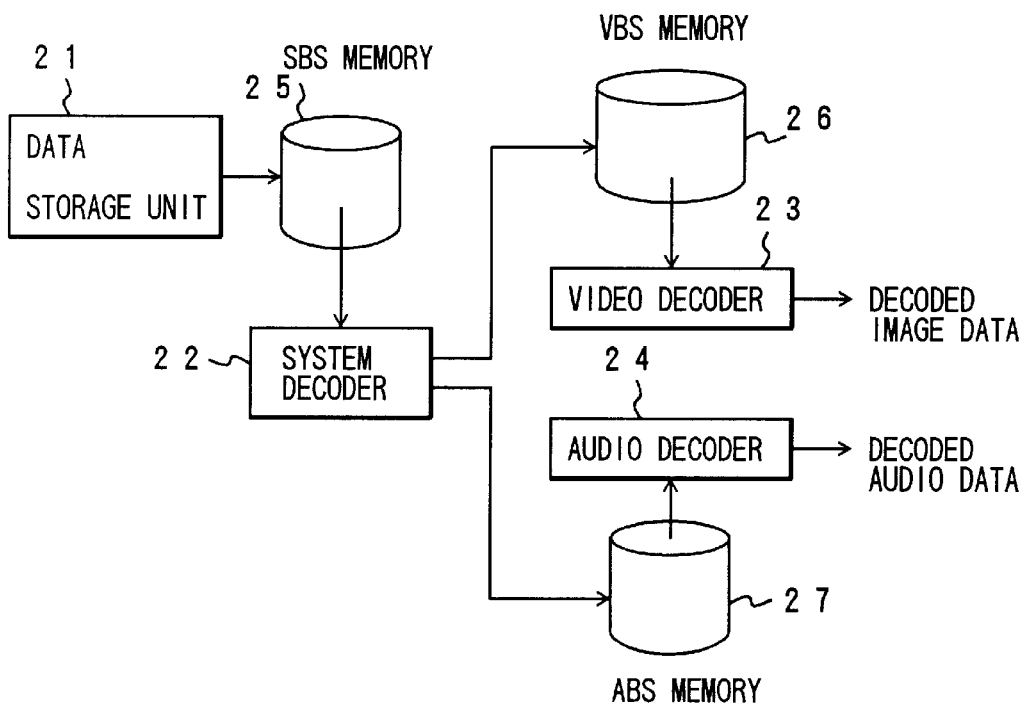
FIG. 1 is a block diagram showing the schematic arrangement of a conventional image/audio reproducing apparatus.
Figure 2:
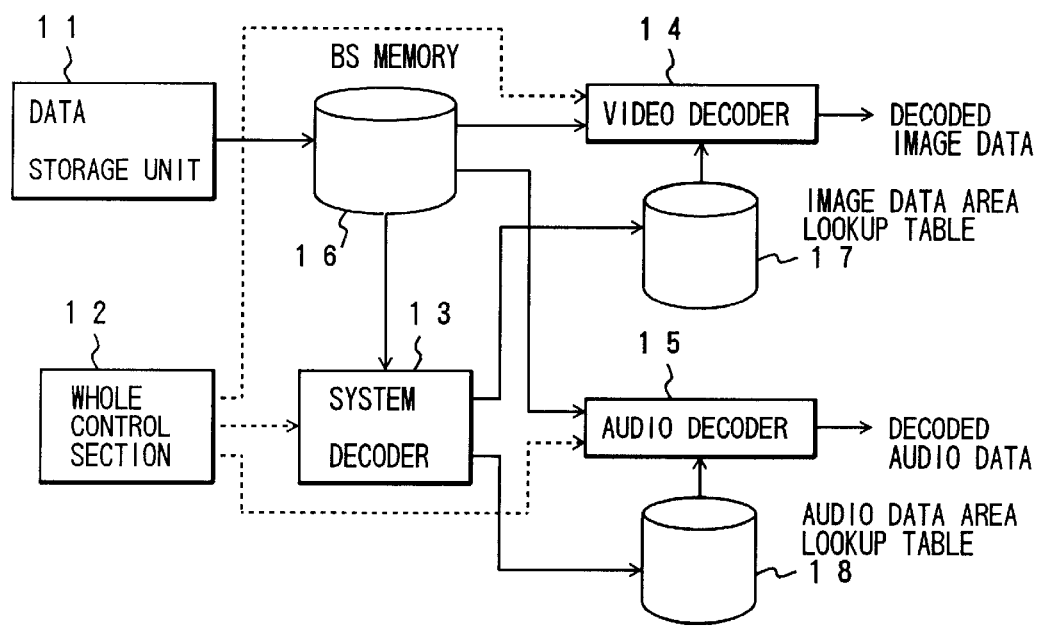
FIG. 2 is a block diagram showing the schematic arrangement of an image/audio reproducing apparatus according to an embodiment of the present invention.
Figure 3:
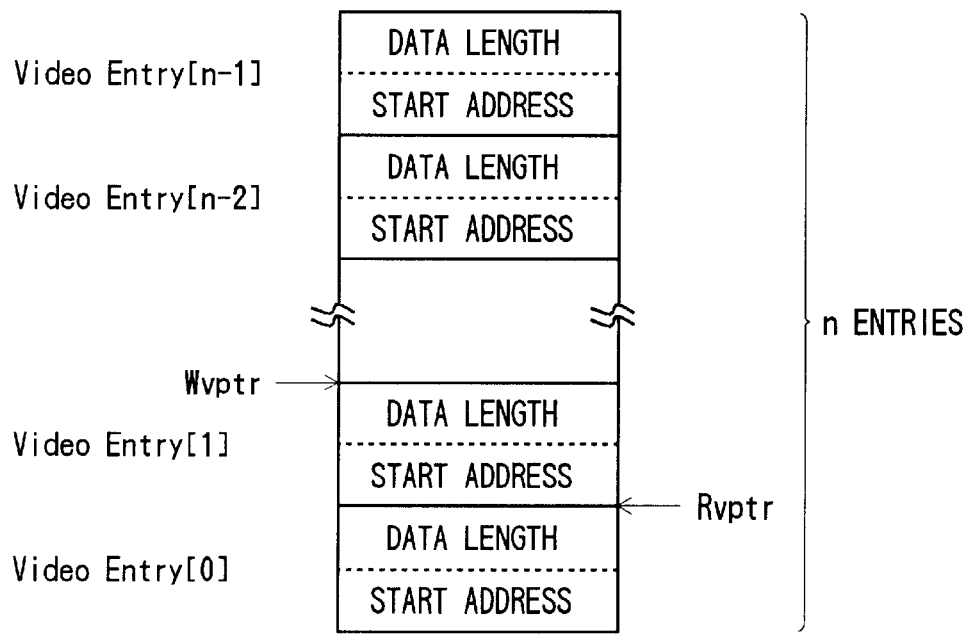
FIG. 3 is an explanatory view of an image data area lookup table.
Figure 4:
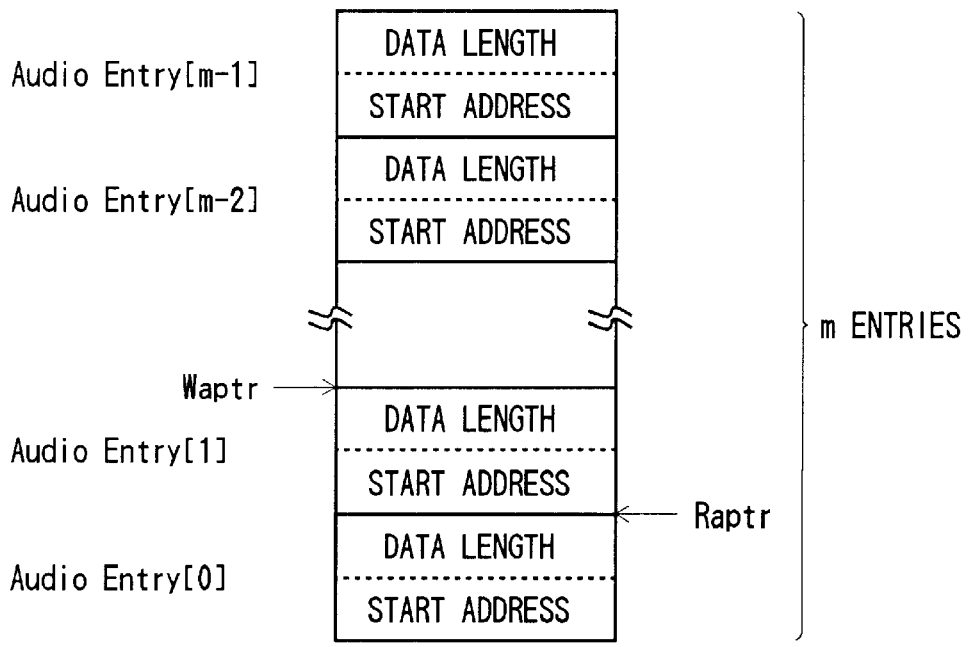
FIG. 4 is an explanatory view of an audio data area lookup table.

FIG. 2 is a block diagram of an image/audio reproducing apparatus according to an embodiment of the present invention. FIG. 3 is a view of an image data area lookup table in the image/audio reproducing apparatus shown in FIG. 2. FIG. 4 is a view of an audio data area lookup table in the image/audio reproducing apparatus of the present invention.

The image/audio reproducing apparatus of this embodiment comprises a data storage unit 11, a whole control section 12, a system decoder 13, a video decoder 14, an audio decoder 15, a BS memory 16, an image data area lookup table 17, and an audio data area lookup table 18.

The whole control section 12 is a block for controlling the system decoder 13, the video decoder 14, and the audio decoder 15. When necessary and sufficient data to be decoded by the video decoder 14 and audio decoder 15 is not demultiplexed, the whole control section 12 designates the amount of data to be demultiplexed to the system decoder 13 and causes the system decoder 13 to demultiplex the data into image data and audio data. The data amount corresponds to the coded data amount of the image or audio data. When one of the image and audio data is demultiplexed on the basis of the data amount, the other data is also demultiplexed. When the necessary and sufficient data to be decoded has been demultiplexed, the whole control section 12 designates the number of image frames and the number of audio frames to be decoded to the video decoder 14 and audio decoder 15, and causes the video and audio decoders to decode/reproduce the data.

The system decoder 13 loads coded data having an appropriate length from the data storage unit 11 to the BS memory 16. Generally, digitally coded data in which image data and audio data are multiplexed has information associated with data at each data string. This information is called header information, or simply, a header. The header information includes the type and length of data string, and time information. The system decoder 13 analyzes the header of the coded data loaded in the BS memory 16 and detects an image data string and an audio data string. When the system decoder 13 detects an image data string, the start address and length in the BS memory 16 are stored in a table entry indicated by a current write pointer Wvptr of the image data area lookup table 17. The write pointer Wvptr of the image data area lookup table 17 is incremented by one and updated to the next table entry. Upon detecting an audio data string, the start address and length in the BS memory 16 are stored in an entry indicated by a current write pointer Waptr of the audio data area lookup table 18. The write pointer Waptr of the audio data area lookup table 18 is incremented by one and updated to the next table entry. The system decoder 13 repeats the above processing until the total amount of detected image or audio data exceeds the data amount designated by the whole control section 12. Note that the BS memory 16, the image data area lookup table 17, and the audio data area lookup table 18 are mapped on a real memory incorporated in the reproducing apparatus.

The BS memory 16 is a ring buffer having a predetermined size. When data is loaded from the data storage unit 11 and demultiplexed up to the final address, the address returns to the start address of the BS memory 16 without any special instruction to continue the processing. If data loaded from the data storage unit 11 is overwritten in an area where the video decoder 14 or audio decoder 15 has not read data yet, erroneous data is transferred. To prevent this, when data is to be loaded from the data storage unit 11, the system decoder 13 performs control such that the loaded data is not overwritten at the read address of the video decoder 14 or audio decoder 15.

The image data area lookup table 17 is constituted by a ring buffer having n table entries, as shown in FIG. 3. Upon reaching the nth table entry Video Entry [n−1], the write pointer Wvptr of the image data area lookup table 17 is set to "0" without any special instruction, so the entry returns to the start table entry Video Entry [0] to continue the processing. When the write pointer Wvptr of the table entry passes a read pointer Rvptr, erroneous data is transferred to the video decoder 14. To prevent this, the system decoder 13 performs control such that the write pointer Wvptr does not to pass the read pointer Rvptr.

Similarly, the audio data area lookup table 18 is constituted by a ring buffer having m table entries, as shown in FIG. 4. Upon reaching the mth table entry Audio Entry [m−1], the write pointer Waptr of the audio data area lookup table 18 is set to "0" without any special instruction, so the entry returns to the start table entry Audio Entry [0] to continue the processing. When the write pointer Waptr of the table entry passes a read pointer Raptr, erroneous data is transferred to the audio decoder 15. To prevent this, the system decoder 13 performs control such that the write pointer Waptr does not pass the read pointer Raptr.

Upon receiving an instruction by the whole control section 12, the video decoder 14 reads out data from the memory area of the BS memory 16, which is designated in the table entry indicated by the current read pointer Rvptr and decodes/reproduces the image data. When data in the memory area indicated by one table entry is completely read out, the read pointer Rvptr of the image data area lookup table 17 is incremented by one and updated to the next table entry. At the same time, data is continuously read out from the memory area of the BS memory 16 indicated by the next table entry to continue decoding/reproduction. The video decoder 14 repeats this processing until decoding/reproduction of image frames in number designated by the whole control section 12 is complete.

When data in the memory area indicated by the nth table entry Video Entry [n−1] is completely read out, the read pointer Rvptr of the image data area lookup table 17 is set to "0" without any special instruction, so the entry returns to the start table entry Video Entry [0] to continue the processing. If decoding/reproduction of frames in number designated by the whole control section 12 is complete before image data in the memory area of the BS memory 16, which is indicated by the current table entry undergoing the read, is completely read out, the address at which the data is read out is stored. Upon receiving the next instruction from the whole control section 12, processing is restarted from the stored address. If the read pointer Rvptr of the table entry passes the write pointer Wvptr, erroneous data is read out. To prevent this, the video decoder 14 performs control such that the read pointer Rvptr does not pass the write pointer Wvptr.

In this way, the video decoder 14 sequentially accesses the memory areas designated by the image data area lookup table 17, sequentially reads out only image data stored in the BS memory 16, and decodes the image data.

Upon receiving an instruction by the whole control section 12, the audio decoder 15 reads out data from the memory area of the BS memory 16, which is designated in the table entry indicated by the current read pointer Raptr and decodes/reproduces the audio data. When data in the memory area indicated by one table entry is completely read out, the read pointer Raptr of the audio data area lookup table 18 is incremented by one and updated to the next table entry. At the same time, audio data is continuously read out from the memory area of the BS memory 16 indicated by the next table entry to continue decoding/reproduction of the audio data. The audio decoder 15 repeats this processing until decoding/reproduction of audio frames in number designated by the whole control section 12 is complete.

When data in the memory area indicated by the mth table entry Audio Entry [m−1] is completely read out, the read pointer Raptr of the audio data area lookup table 18 is set to "0" without any special instruction, so the entry returns to the start table entry Audio Entry [0] to continue the processing. If decoding/reproduction of frames in number designated by the whole control section 12 is complete before data in the memory area of the BS memory 16, which is indicated by the current table entry undergoing the read, is completely read out, the address at which the data is read out is stored. Upon receiving the next instruction from the whole control section 12, processing is restarted from the stored address. If the read pointer Raptr of the table entry passes the write pointer Waptr, erroneous data is read out. To prevent this, the audio decoder 15 performs control such that the read pointer Raptr does not pass the write pointer Waptr.

In this way, the audio decoder 15 sequentially accesses the memory areas of the BS memory, which are designated by the audio data area lookup table 18, sequentially reads out only audio data stored in the BS memory 16, and decodes the audio data.

Figure 5A:
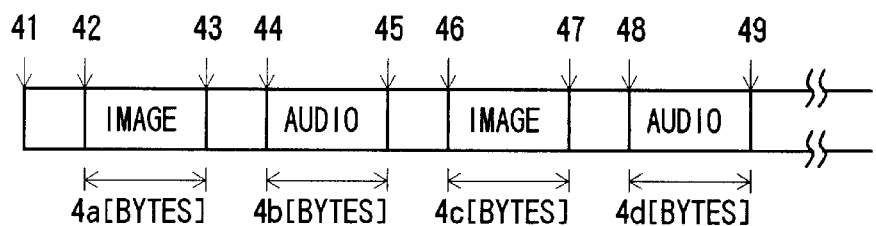
FIGS. 5A to 5C are views showing an example of a data pattern in a BS memory.
Figure 5B:
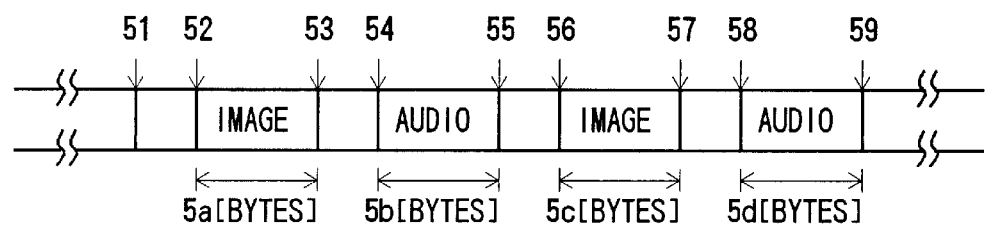
Figure 5C:
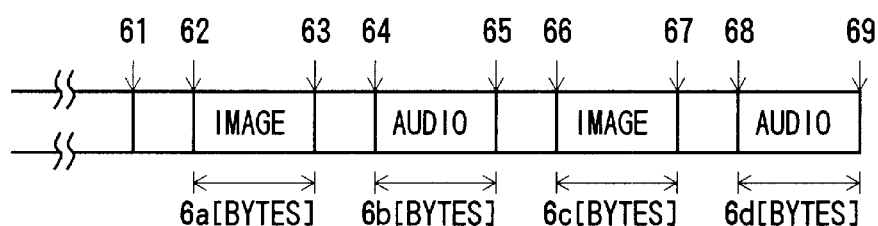
Figure 6:
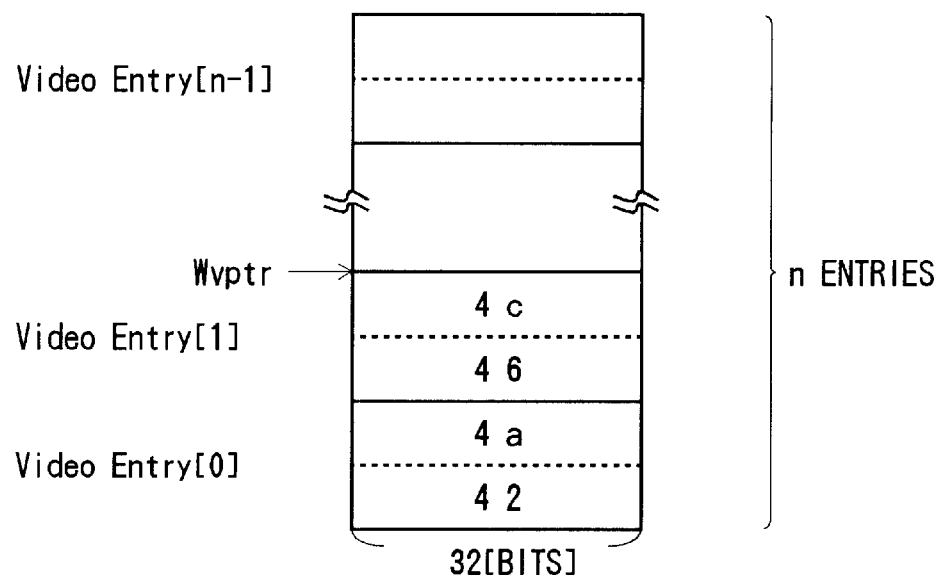
FIGS. 6 and 7 are explanatory views showing an example of the image data area lookup table.
Figure 7:
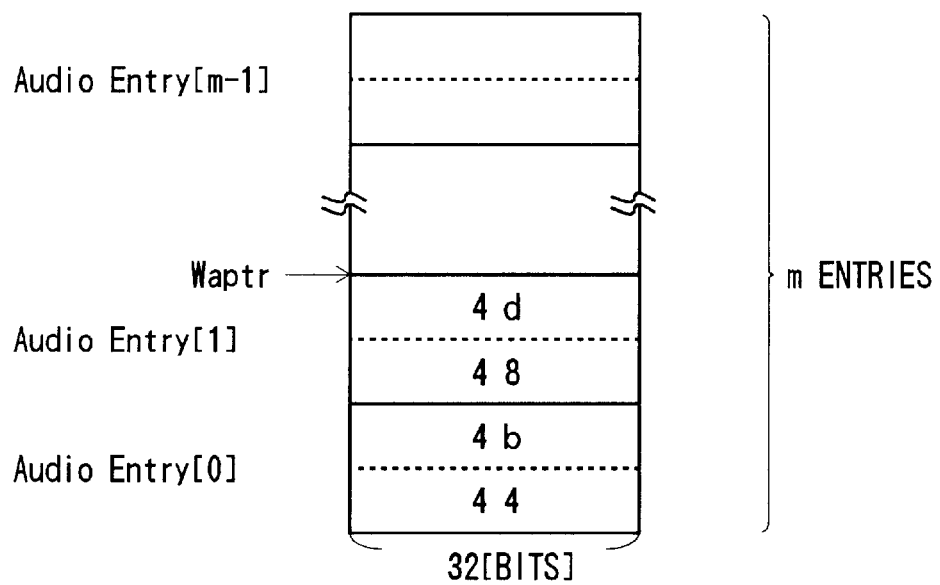
Figure 8:
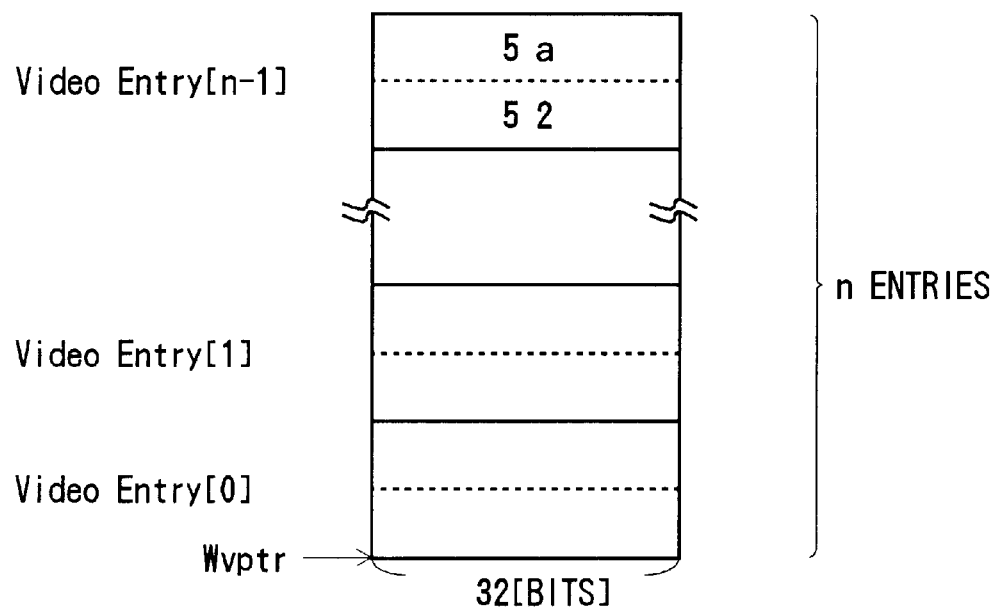
FIGS. 8 and 9 are explanatory views showing an example of the audio data area lookup table.
Figure 9:
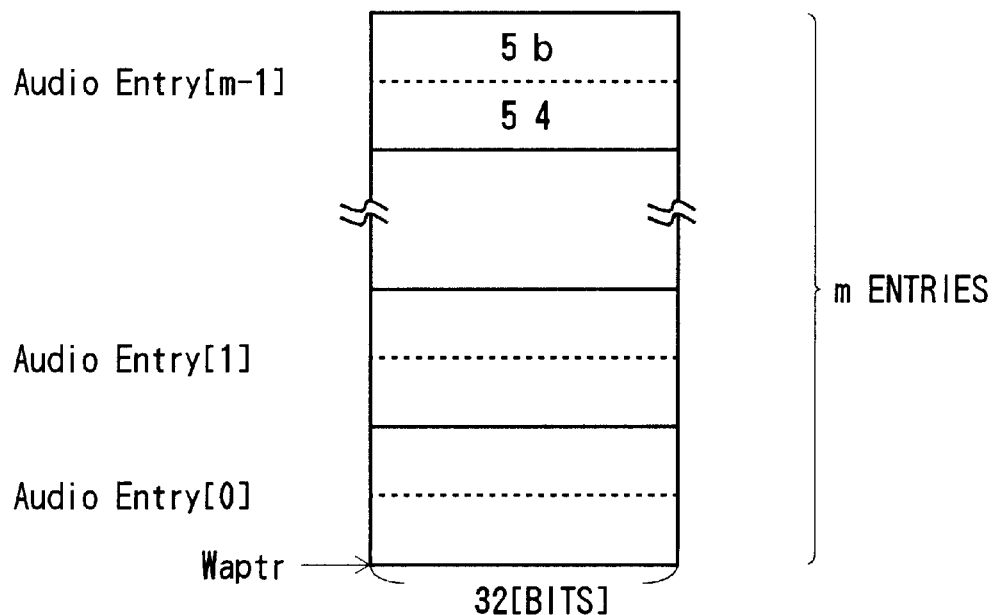

FIGS. 5A to 5C shows an example of a data pattern of coded data loaded in the BS memory 16. FIG. 5A shows the start portion of the BS memory 16, FIG. 5B shows the intermediate portion of the BS memory 16, and FIG. 5C shows the end portion of the BS memory 16. FIGS. 6 and 8 show examples of the image data area lookup table 17, and FIGS. 7 and 9 show examples of the audio data area lookup table 18.

An address 41 is the start address of the BS memory 16. The system decoder 13 starts header analysis and image and audio data detection from the address 41. Header information associated with subsequent image data or the like is stored between the address 41 and an address 42. By analyzing this header information, the start address 42 and length 4a [bytes] of the image data string are obtained. Header information associated with subsequent audio data or the like is stored between addresses 43 and 44. By analyzing this header information, the start address 44 and length 4b [bytes] of the audio data string are obtained. In a similar manner, a start address 46 and length 4c [bytes] of the subsequent image data string and a start address 48 and length 4d [bytes] of the subsequent audio data string are obtained.

The system decoder 13 sequentially stores the image data string address information obtained in the above manner in an entry of the image data area lookup table 17, as shown in FIG. 6. The write pointer Wvptr of the image data area lookup table 17 is incremented and updated to the next table entry. The audio data string address information is also sequentially stored in an entry of the audio data area lookup table 18. The write pointer Waptr of the audio data area lookup table 18 is incremented and updated to the next table entry. This processing is repeated until the data amount designated by the whole control section 12 is detected. In this embodiment, the table entry is constituted by 32 [bits] words.

If a start address 52 and length 5a [bytes] of the image data string are stored in the nth table entry, as shown in FIG. 8, the write pointer Wvptr is returned to the start of the entry to repeat the processing. Similarly, if a start address 54 and length 5b [bytes] of the audio data string are stored in the mth table entry, as shown in FIG. 9, the write pointer Waptr is returned to the start of the entry to repeat the processing.

Figure 10:
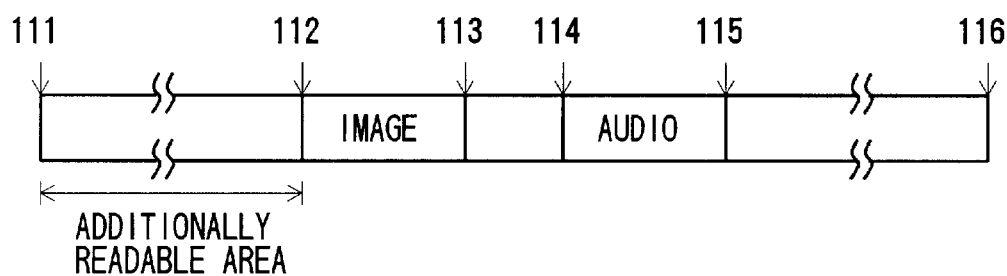
FIG. 10 is a view showing another example of the data pattern in the BS memory.

When the address information (a start address 68 and length 6d) of the audio data string shown in FIG. 5C are detected, and the address reaches the end of the BS memory 16, data is newly loaded from the data storage unit 11 to the BS memory 16, and processing is continued from the start address of the BS memory 16. Assume that memory areas of the video decoder 14 and audio decoder 15, which are undergoing the read, are an area from an address 112 to an address 113, and an area from an address 114 to an address 115, respectively, as shown in FIG. 10. In this case, since the subsequent areas have not been processed yet, an area where data can be overwritten corresponds to an area from a start address 111 to the address 112. The system decoder 13 performs the above control to additionally load coded data from the data storage unit 11 to the BS memory 16.

Figure 11:
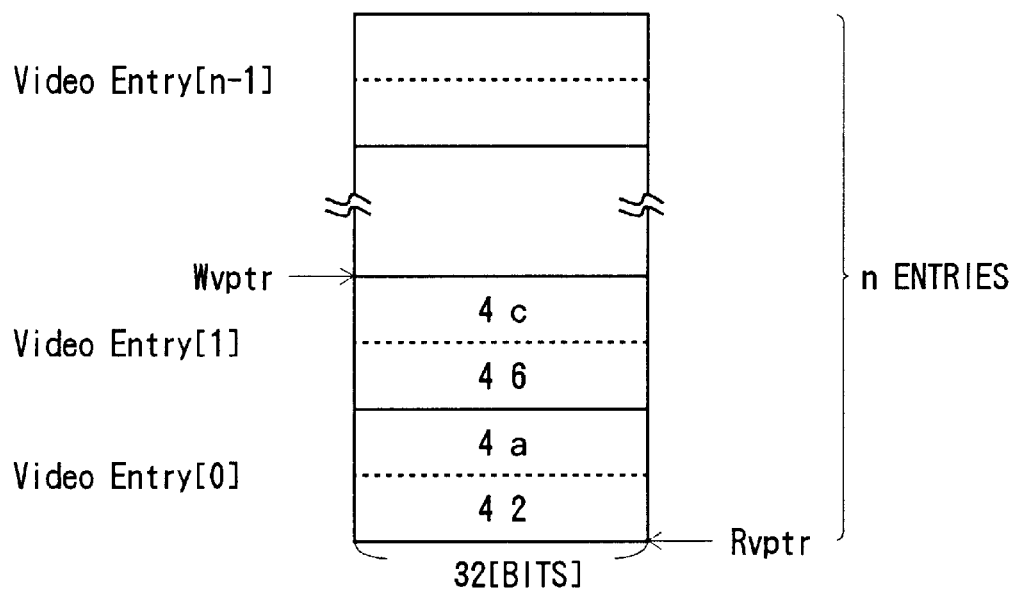
FIGS. 11 to 13 are explanatory views showing other examples of the image data area lookup table.
Figure 12:
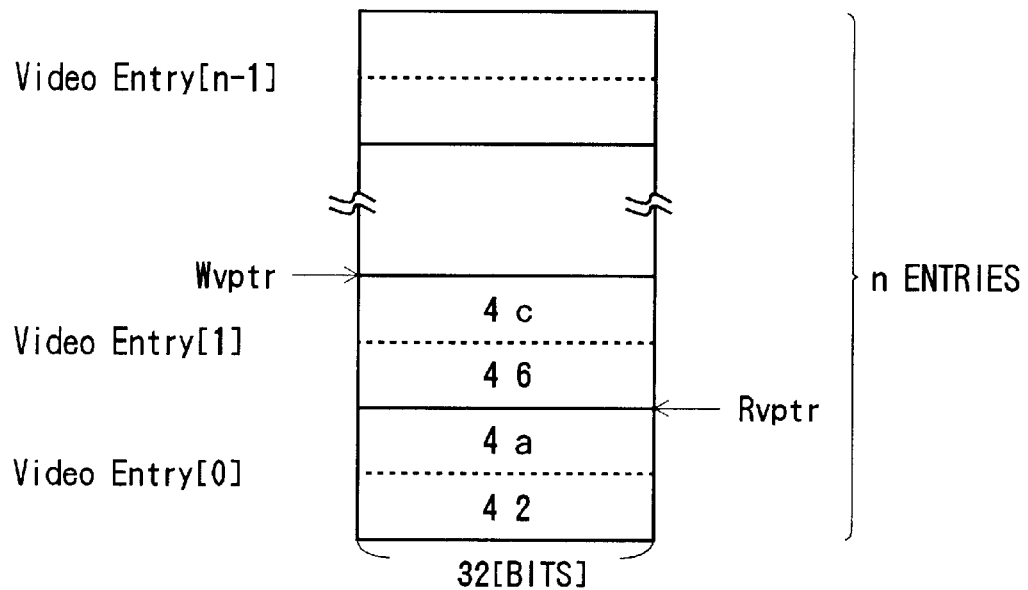

The operation of the video decoder 14 will be described next. Assume that after the system decoder 13 stores the address information of the image data in the table entry, as shown in FIG. 6, a decoding/reproduction instruction is received from the whole control section 12. The write pointer Wvptr and read pointer Rvptr are at positions shown in FIG. 11. First, the video decoder 14 starts to read data from the start address 42 designated in the table entry Video Entry [0] and decodes/reproduces the data. When the data string with the length 4a [bytes] designated in the table entry Video Entry [0] is completely read out, the read pointer Rvptr of the image data area lookup table 17 is incremented and updated to the next table entry Video Entry [1], as shown in FIG. 12. The data is continuously read out from the start address 46 designated in the table entry Video Entry [1] and decoded/reproduced.

Figure 13:
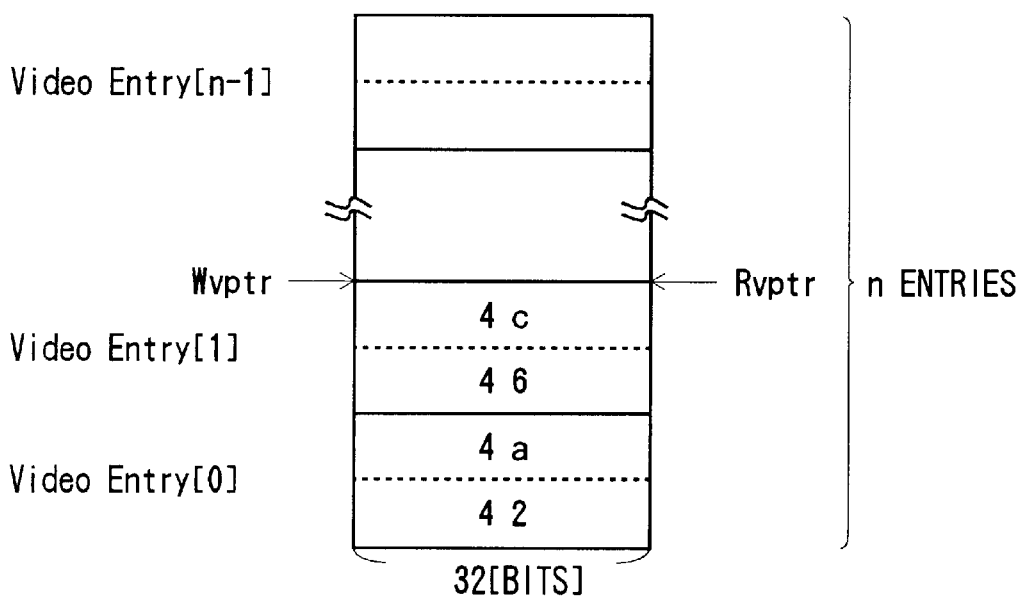

As shown in FIG. 13, when the read pointer Rvptr of the table entry catches up with the write pointer Wvptr, the subsequent data read is disabled. Decoding/reproduction is stopped, and control is performed such that the read pointer Rvptr does not pass the write pointer Wvptr.

When data in the memory area designated in the nth table entry Video Entry [n−1] is completely read out, the read pointer Rvptr is returned to the start table entry Video Entry [0] to repeat the processing.

In this manner, the video decoder 14 sequentially reads out only image data stored in the BS memory 16 and decodes/reproduces the data.

Figure 14:
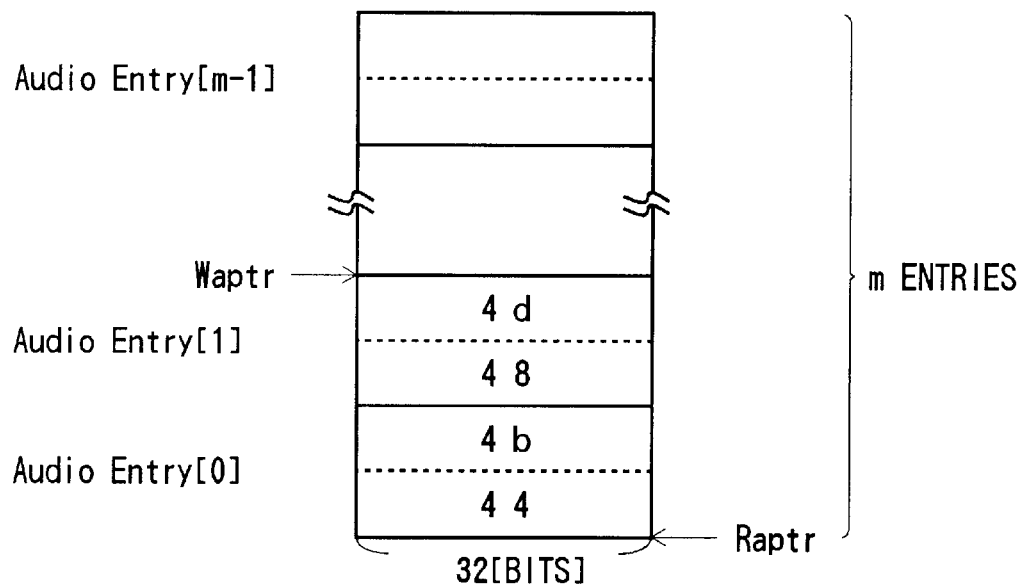
FIGS. 14 to 16 are explanatory views showing other examples of the audio data area lookup table.
Figure 15:
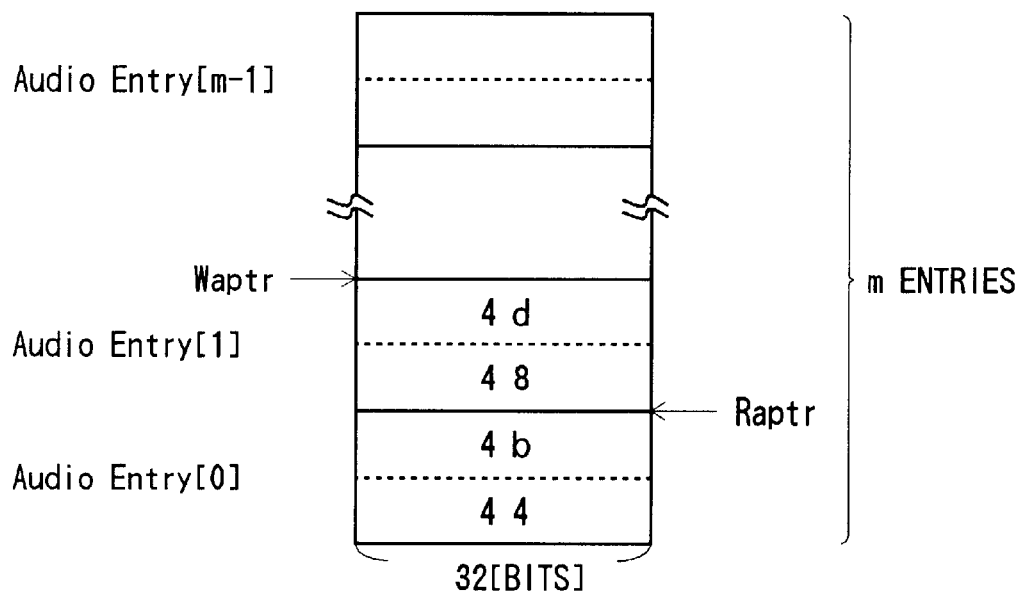

The operation of the audio decoder 15 will be described next. Assume that after the system decoder 13 stores the address information of the audio data in the table entry, as shown in FIG. 7, a decoding/reproduction instruction is received from the whole control section 12. The write pointer Waptr and read pointer Raptr are at positions shown in FIG. 14. First, the audio decoder 15 starts to read data from the start address 44 designated in the table entry Audio Entry [0] and decodes/reproduces the data. When the data string with the length 4b [bytes] designated in the table entry Audio Entry [0] is completely read out, the read pointer Raptr of the audio data area lookup table 18 is incremented and updated to the next table entry Audio Entry [1], as shown in FIG. 15. The data is continuously read out from the start address 48 designated in the table entry Audio Entry [1] and decoded/reproduced.

Figure 16:
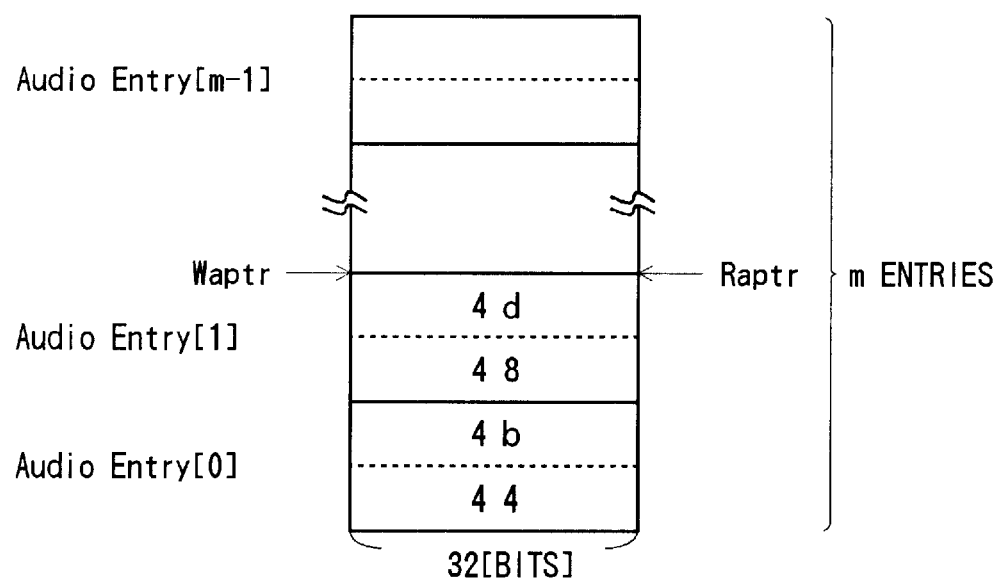

As shown in FIG. 16, when the read pointer Raptr of the table entry catches up with the write pointer Waptr, the subsequent data read is disabled. Decoding/reproduction is stopped, and control is performed such that the read pointer Raptr does not pass the write pointer Waptr.

When data in the memory area designated in the mth table entry Audio Entry [m−1] is completely read out, the read pointer Raptr is returned to the start table entry Audio Entry [0] to repeat the processing.

In this manner, the audio decoder 15 sequentially reads out only audio data stored in the BS memory 16 and decodes/reproduces the data.

When the length of a data string is 4,096 [bytes], data transfer by the conventional reproducing apparatus requires memory write processing of 4,096 [bytes]. However, in this embodiment in which the table entry is assumed to have 32 [bits] words, memory write processing of 32 [bits] representing the start address of the data string and 32 [bits] representing the length of the data string, i.e., the total of 8 [bytes] suffices. Therefore, the load in data transfer between decoders can be largely reduced.

What is claimed is:

1. An image/audio reproducing apparatus for decoding/reproducing coded data in which digitally compressed/coded image and audio data are multiplexed, comprising:

a data storage unit for storing coded data;

a BS memory for temporarily storing the coded data read out form said data storage unit;

an image data area lookup table for storing address information of a data string having continuous image data in said BS memory;

an audio data area lookup table for storing address information of a data string having continuous audio data in said BS memory;

a system decoder for loading the coded data from said data storage unit to said BS memory, analyzing a header of the coded data to detect an image data and an audio data, and upon detecting the image data, storing address information of the image data in said image data area lookup table, and upon detecting the audio data, storing address information of the audio data in said audio data area lookup table;

a video decoder for accessing said BS memory in accordance with the address information in said image data area lookup table to read out the image data stored in said BS memory and decoding the image data; and an audio decoder for accessing said as memory in accordance with the address information in said audio data area lookup table to read out the audio data stored in said BS memory and decoding the audio data, said system decoder operable for preventing overwriting of said image and audio data in said BS memory by additional image and audio data from said data storage unit when said video and audio data in said BS memory has not been read by said video decoder and said audio decoder respectively.

2. An apparatus according to claim 1, wherein each of said image data area lookup table and said audio data area lookup table is a set of table entries in which a set of start address information and length information of the data string having continuous image or audio data in said BS memory is stored.

3. An apparatus according to claim 1, wherein said BS memory comprises a ring buffer having a predetermined size.

4. An apparatus according to claim 1, further comprising a whole control section for designating an amount of the coded data to be demultiplexed into the image data and the audio data to said system decoder and designating the number of frames to be decoded to said video decoder and said audio decoder.

5. An apparatus as recited in claim 1 wherein said image data area lookup table has a read pointer and a write pointer and said system decoder is operable to prevent said write pointer from incrementing through an address currently pointed to by said read pointer.

6. An apparatus as recited in claim 1 wherein said audio data area lookup table has a read pointer and a write pointer and said system decoder is operable to prevent said write pointer from incrementing through an address currently pointed to by said read pointer.

7. An apparatus as recited in claim 5, wherein said audio data area lookup table has a read pointer and a write pointer and said system decoder is operable to prevent said write pointer from incrementing through an address currently pointed to by said read pointer.

8. An apparatus as recited in claim 1, wherein said image data area lookup table has a read pointer and a write pointer and said video decoder is operable to prevent said read pointer from incrementing through an address currently pointed to by said write pointer.

9. An apparatus as recited in claim 1, wherein said image data area lookup table has a read pointer and a write pointer and said audio decoder is operable to prevent said read pointer from incrementing through an address currently pointed to by said write pointer.

10. An apparatus as recited in claim 8, wherein said image data area lookup table has a read pointer and a write pointer and said audio decoder is operable to prevent said read pointer from incrementing through an address currently pointed to by said write pointer.

* * * * *